United States Patent
Powell et al.

(10) Patent No.: US 7,969,282 B2
(45) Date of Patent: Jun. 28, 2011

(54) OPTIMIZED OPERATION OF A DENSE READER SYSTEM

(75) Inventors: Kevin J. Powell, Annapolis, MD (US);
William R. Bandy, Gambrills, MD (US); Michael R. Arneson, Finksburg, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 921 days.

(21) Appl. No.: 11/312,606

(22) Filed: Dec. 21, 2005

(65) Prior Publication Data

US 2007/0139163 A1    Jun. 21, 2007

(51) Int. Cl.
*H04Q 5/22*    (2006.01)
(52) U.S. Cl. .................. 340/10.2; 340/572.1; 340/10.5; 370/328
(58) Field of Classification Search .................. 340/10.2, 340/572.1, 10.5; 370/328
See application file for complete search history.

(56) References Cited

U.S. PATENT DOCUMENTS

| | | | |
|---|---|---|---|
| 5,995,019 A | 11/1999 | Chieu et al. | |
| 6,107,910 A | 8/2000 | Nysen | |
| 6,433,671 B1 | 8/2002 | Nysen | |
| 6,531,957 B1 | 3/2003 | Nysen | |
| 6,580,358 B1 | 6/2003 | Nysen | |
| 6,726,099 B2 * | 4/2004 | Becker et al. | 235/380 |
| 6,950,009 B1 | 9/2005 | Nysen | |
| 7,023,342 B2 * | 4/2006 | Corbett et al. | 340/572.1 |
| 7,176,797 B2 | 2/2007 | Zai et al. | |
| 7,356,495 B2 * | 4/2008 | Beigl et al. | 705/28 |
| 7,411,921 B2 * | 8/2008 | Strong et al. | 370/328 |
| 7,420,458 B1 * | 9/2008 | Kuzma et al. | 340/10.34 |
| 7,501,953 B2 * | 3/2009 | Diorio et al. | 340/572.4 |
| 2005/0088284 A1 * | 4/2005 | Zai et al. | 340/10.2 |
| 2005/0225447 A1 * | 10/2005 | Diorio et al. | 340/572.4 |

(Continued)

FOREIGN PATENT DOCUMENTS

WO    W02007/078440    7/2007

OTHER PUBLICATIONS

Bandy et al., U.S. Appl. No. 11/312,494, filed Dec. 21, 2005, entitled "Dense Reader System with Improved Listen Before Talk Communications".

(Continued)

*Primary Examiner* — George A Bugg
*Assistant Examiner* — Bradley E Thompson
(74) *Attorney, Agent, or Firm* — Bartholomew J. Divita; Terri S. Hughes (57) ABSTRACT

Methods, systems and apparatuses for RFID readers forming a reader network are described. In an aspect of the present invention, a plurality of RFID readers are configured to interrogate tags. Furthermore, the readers are configured to communicate with one another. Each of the readers include a ID number which identifies that particular reader within a reader network during communications. Each reader includes a network interface module and an optimization module to receive and process statistical data obtained from other readers in the network. Aspects of the present invention include a 'primary/secondary' reader network configuration, as well as a 'distributed elements' reader network configuration. A set of operational rules for the environment is indicated, and tag interrogations are optimized according to the rules. Readers may communicate according to a "Listen Before Talk" (LBT) protocol to avoid undesirable interference. Individual readers are capable of dynamically establishing and joining a network, and leaving the network in a self-configured and semi-autonomous or autonomous manner.

25 Claims, 8 Drawing Sheets

U.S. PATENT DOCUMENTS

| | | | |
|---|---|---|---|
| 2006/0022800 A1* | 2/2006 | Krishna et al. | 340/10.2 |
| 2006/0022801 A1* | 2/2006 | Husak et al. | 340/10.5 |
| 2006/0022815 A1* | 2/2006 | Fischer et al. | 340/505 |
| 2006/0114104 A1* | 6/2006 | Scaramozzino | 340/10.2 |
| 2006/0232412 A1* | 10/2006 | Tabacman et al. | 340/572.1 |
| 2006/0267733 A1* | 11/2006 | Steinke et al. | 340/10.1 |
| 2007/0046467 A1* | 3/2007 | Chakraborty et al. | 340/572.1 |
| 2007/0139162 A1* | 6/2007 | Bandy et al. | 340/10.2 |
| 2007/0139163 A1* | 6/2007 | Powell et al. | 340/10.2 |
| 2008/0186180 A1* | 8/2008 | Butler et al. | 340/572.1 |

OTHER PUBLICATIONS

Arneson et al., U.S. Appl. No. 11/363,279, filed Feb. 28, 2006, entitled "Smart RFID Reader Antennas".

*Will Nokia's bet on RFID pay off?*, printed from http://torwug.org/WhitePapers/local/RFID.asp, 4 pages (Apr. 14, 2004).

Jan Kruys, "Co-existance of Dissimilar Wireless Systems", (Third draft, Dec. 3, 2003); 8 pages, Copyrighted to Cisco Systems printed from: http://main.wifi.org/membersonly/getfile.asp?f=Coexistence_Dissimilar_Systems.pdf.

International Search Report, International Application No. PCT/US 06/44531, Date of Mailing Oct. 17, 2007, 12 pages.

Specification for RFID Air Interface: EPC™ Radio-Frequency Identity Protocols Class-1 Generation-2 UHF RFID Protocol for Communications at 860 MHz-960 MHz: Version 1.0.9, EPCglobal Inc., 93 pages (2004).

International Search Report dated Oct. 17, 2007 in related case PCT/US06/44531.

* cited by examiner

OPTIMIZED OPERATION OF A DENSE READER SYSTEM

CROSS-REFERENCE TO RELATED APPLICATIONS

The following application of common assignee is related to the present application, has the same filing date as the present application, and are herein incorporated by reference in their entireties:

"Dense Reader System With Improved Listen Before Talk Communications," U.S. application Ser. No. 11/312,494.

BACKGROUND OF THE INVENTION

1. Field of the Invention

The present invention relates generally to radio frequency identification (RFID) systems, and more particularly to systems and methods for communications among RFID readers.

2. Background Art

Radio frequency identification (RFID) tags are electronic devices that may be affixed to items whose presence is to be detected and/or monitored. The presence of an RFID tag, and therefore the presence of the item to which the tag is affixed, may be checked and monitored by devices known as "readers." Readers typically have one or more antennas transmitting radio frequency signals to which tags respond. Once a reader receives signals back from the tags, the reader passes that information in digital form to a host computer, which decodes and processes the information.

With the maturation of RFID technology, efficient communication between tags and readers has become a key enabler in supply chain management especially in manufacturing, shipping, and retail industries, as well as in building security installations, healthcare facilities, libraries, airports etc.

In some environments, multiple readers may be present. It may be advantageous for a particular group of RFID tags be interrogated by more than one reader. Various RFID communication protocols enable this functionality. For example, the emerging standardized RFID communication protocol known as Gen 2, allows for RFID tags to be commanded into a number of possible "states," allowing several readers to interrogate the same tag population.

However, when multiple readers simultaneously send out interrogation signals to an overlapping group of tags, this may cause interference between the interrogation signals. As a result, there may be signal conflict and/or signal degradation, resulting in loss of information.

Thus, what is needed are more efficient and reliable ways for multiple RFID readers to efficiently communicate with RFID tags without unwanted interference.

BRIEF SUMMARY OF THE INVENTION

Methods, systems, and devices for operation of RFID readers in a networked configuration are described.

In an aspect of the present invention, a plurality of RFID readers are each configured to interrogate tags. Additionally, the readers are capable of communicating with one another. The readers form a reader network. Each reader has an ID number which identifies the reader uniquely within the reader network.

In a further aspect, each reader includes a network interface module to communicate with other readers of the reader network. In a still further aspect, each reader includes an optimization module to process statistical data obtained from other readers in the network.

In aspects, reader networks of the present invention can be configured in various ways, including a primary reader/secondary reader configuration, as well as a distributed reader configuration. One or more sets of operational rules for communicating in a network environment can be downloaded by each reader and/or may be pre-stored by each reader. Reader network communications and/or tag interrogations can be optimized according to the rules.

In a still further aspect, individual readers are capable of dynamically establishing and joining a network, and leaving the network in a self-configured and semi-autonomous or autonomous manner.

In an aspect of the present invention, the readers follow a "Listen Before Talk" or LBT protocol when communicating in the reader network to avoid undesirable interference. In LBT, each reader checks the communication environment before issuing a communication, such as a tag interrogation command.

In an example LBT implementation, communications are performed by a first RFID reader. A first tag interrogation is performed in a frequency channel by the first reader. A determined period of time is waited, during which the first reader does not transmit a tag interrogation signal. After waiting, it is determined whether a tag interrogation due to another reader is occurring in the frequency channel. A second tag interrogation is performed in the frequency channel by the first reader if it is determined that a tag interrogation due to another reader is not occurring in the frequency channel.

The waiting may be performed by the first reader based on a determined duty cycle for the first reader for performing communications with tags.

If the tag interrogation due to the another reader is occurring in the frequency channel, the first reader may switch frequency channels for further tag communications. Alternatively, the first reader may determine a time slot in which to attempt the second tag interrogation, in order to avoid conflict with communications by another reader.

In another example LBT implementation, a RFID reader includes at least one antenna, a tag communications module coupled to the at least one antenna, and a timing module coupled to the tag communications module. The timing module calculates a desired duty cycle for performing tag interrogations by the reader.

The reader may further include a time slot selector coupled to the tag communications module. The time slot selector is configured to select a time slot if the tag communications module determines that a tag interrogation due to another reader is occurring in a present frequency channel.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present invention relates to systems and methods for reader networks, and for optimizing RFID tag interrogations when a plurality of readers desire to communicate with a particular population of tags. According to an embodiment of the present invention, the plurality of readers form a network and communicate among themselves. A reader network can have hundreds, or even thousands of readers, forming a "dense reader" environment. A dense reader environment has at least two readers communicating with each other, but typically includes ten or more readers.

In order to avoid unwanted interference caused by multiple readers interrogating the tags simultaneously, readers in a network operate according to a set of "network rules," and dynamically configure themselves for most efficient system operation.

Interaction between tags and readers takes place according to one or more RFID communication protocols. Examples of such protocols include Class 0 and Class 1. These are different classes approved by the RFID standards organization EPCglobal (EPC=Electronic Product Code). Another applicable communication protocol is a widely accepted emerging EPC protocol, known as Generation-2 Ultra High Frequency RFID ("Gen 2" in short). Gen 2 allows a number of different tag "states" to be commanded by each reader. A detailed description of the EPC Gen 2 protocol may be found in "EPC™ Radio-Frequency Identity Protocols Class-1 Generation-2 UHF RFID Protocol for Communications at 860 MHz-960 MHz," Version 1.0.7, and published 2004, which is incorporated by reference herein in its entirety.

In an embodiment, a reader has built-in "intelligence." For example, each reader listens to the RFID operating band environment, and makes a decision whether an interrogation command can be issued without interfering with other readers. The reader then acts accordingly. This is known as "listen before talk", or LBT. In this manner, each reader collects information about interrogation statistics relevant to other readers in the network. A high level set of heuristic rules based on collected interrogation statistics can be used to control and optimize network operation.

In an embodiment, the individual readers form an intelligent reader network. The reader network can be a form of "neural net", using artificial intelligence (AI) techniques to dynamically optimize the operation of the reader network based on information flowing between the individual readers and their nearest neighbors.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Reader System Embodiments

Figure 1:
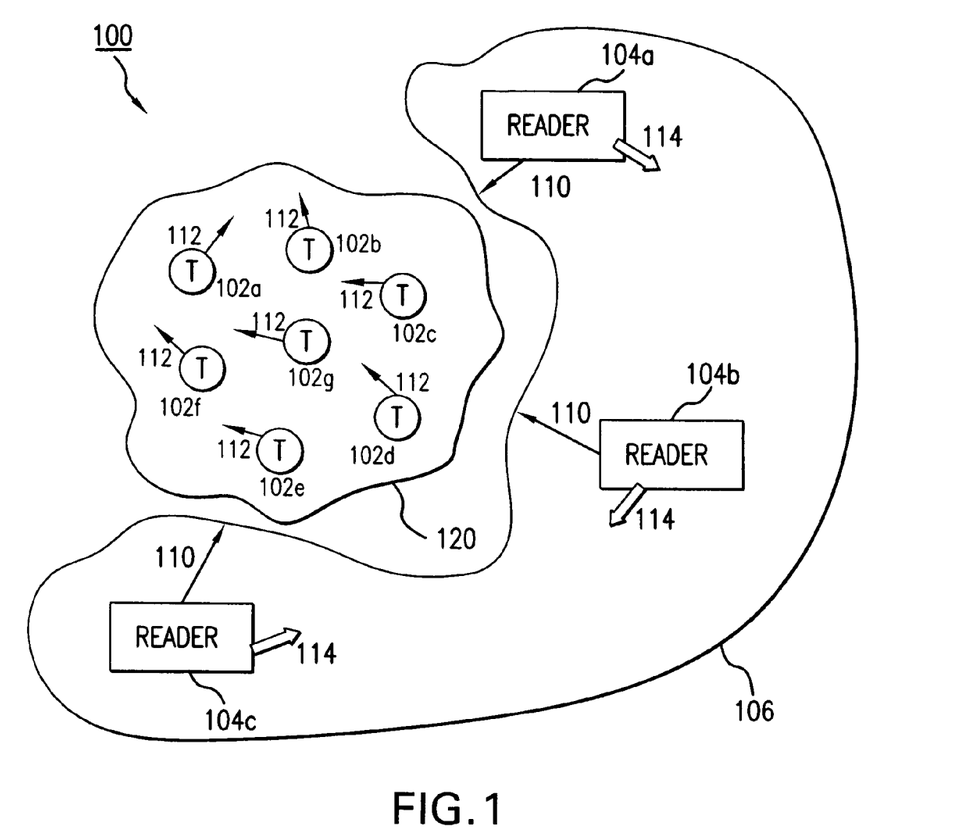
FIG. 1 illustrates an environment where RFID readers communicate with each other as well as with an exemplary population of RFID tags, according to an embodiment of the present invention.

Before describing embodiments of the present invention in detail, it is helpful to describe an example RFID communications environment in which the invention may be implemented. FIG. 1 illustrates an environment 100 where RFID tag readers 104 communicate with an exemplary population 120 of RFID tags 102. As shown in FIG. 1, the population 120 of tags includes seven tags 102a-102g. According to embodiments of the present invention, a population 120 may include any number of tags 102.

Environment 100 includes a plurality of readers 104, such as readers 104a-104c. According to embodiments of the present invention, reader network 106 may include any number of readers 104, including tens, hundreds, thousands, or even more of readers 104. Reader network 106 can be referred to as a "dense reader" network, and environment 100 can be referred to as a "dense reader environment," when a large number of readers are operating as members of the network.

In an embodiment, a reader 104 may be requested by an external application to address the population of tags 120. Alternatively, reader 104 may have internal logic that initiates communication, or may have a trigger mechanism that an operator of reader 104a uses to initiate communication.

As shown in FIG. 1, readers 104 transmit an interrogation signal 110 having a carrier frequency to the population of tags 120. Readers 104 operate in one or more of the frequency bands allotted for this type of RF communication. For example, frequency bands of 902-928 MHz and 2400-2483.5 MHz have been defined for certain RFID applications by the Federal Communication Commission (FCC). Furthermore, due to regulatory or operational considerations, readers 104 may change carrier frequency on a periodic basis (e.g., ranging from 50 to 400 milliseconds) within the operational band. In these "frequency hopping" systems, the operational band is divided into a plurality of hopping channels. For example, the 902-928 MHz frequency band may be divided into 25 to 50 hopping channels, depending upon the maximum bandwidth defined for each hopping channel. The maximum allowable bandwidth for each hopping channel may be set by local or national regulations. For example, according to FCC Part 15, the maximum allowed bandwidth of a hopping channel in the 902-928 MHz band is 500 kHz. Each hopping channel is approximately centered around a specific frequency, referred to herein as the hopping frequency.

Various types of tags 102 may be present in tag population 120 that transmit one or more response signals 112 to an interrogating reader 104, including by alternatively reflecting and absorbing portions of signal 110 according to a time-based pattern or frequency. This technique for alternatively absorbing and reflecting signal 110 is referred to herein as backscatter modulation. Readers 104 receive and obtain data from response signals 112, such as an identification number of the responding tag 102.

In addition to being capable of communicating with tags 102, readers 104a-104c communicate among themselves in a reader network, according to embodiments of the present invention. Each of readers 104a-104c transmits reader signals 114 to others of readers 104a-104c, and receives reader signals 114 from others of readers 104a-104c. As further described below, a reader 104 may transmit a signal 114 to the other readers 104 of reader network 106 requesting to "enter" or "exit" reader network 106, requesting information regarding one or more tags 102, requesting permission to communicate with one or more tags 102, providing information about one or more tags 102, and/or for other reasons. Signal 114 is received by each of the other readers 104, where it is processed by each reader 104. For example, reader 104a may receive information in signal 114 from reader 104b that reader 104a may use to statistically optimize communications with a tag 102 of population 106.

Figure 2:
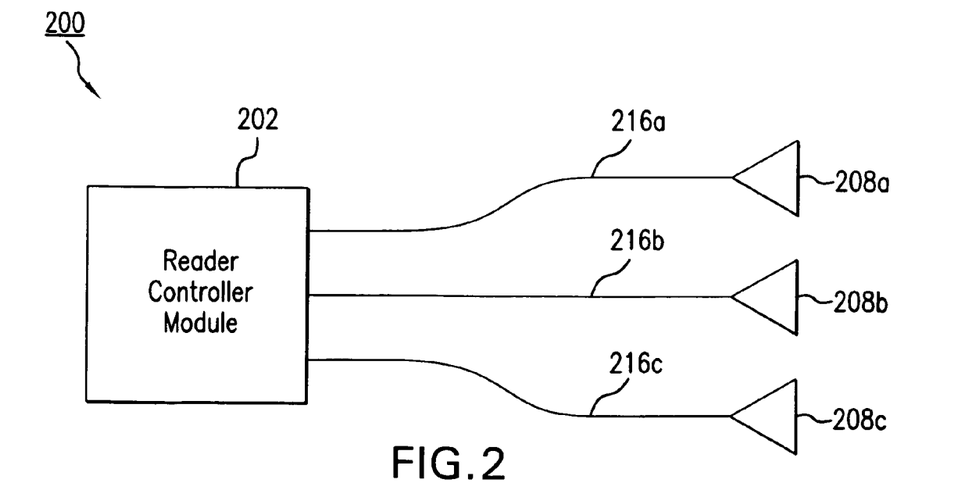
FIG. 2 illustrates a conventional RFID reader.

FIG. 2 shows an example block diagram of a conventional RFID reader 200. Reader 200 has a controller module 202 and a plurality of antennas 208a-208c. Controller module 202 typically includes one or more transmitters, one or more receivers, and one or more processors (not shown in FIG. 2). In the case of an "intelligent reader," controller module 202 may have a considerable amount of on-board computing power and memory, so that it can filter data, store information, run applications, process information, make decision, and execute commands.

Reader 200 has at least one antenna 208 for communicating with tags 102 and/or other readers 104. Antenna 208 may be external or internal. In case of an external configuration, controller module 202 may have one or multiple ports to connect antennas 208a-208c. Antennas 208a-208c may be connected to controller module 202 by RF cables 216a-216c. Embodiments of the present invention are applicable to reader 200, and to any other configuration of reader, including hand-held readers, stationary readers, etc.

Figure 3:
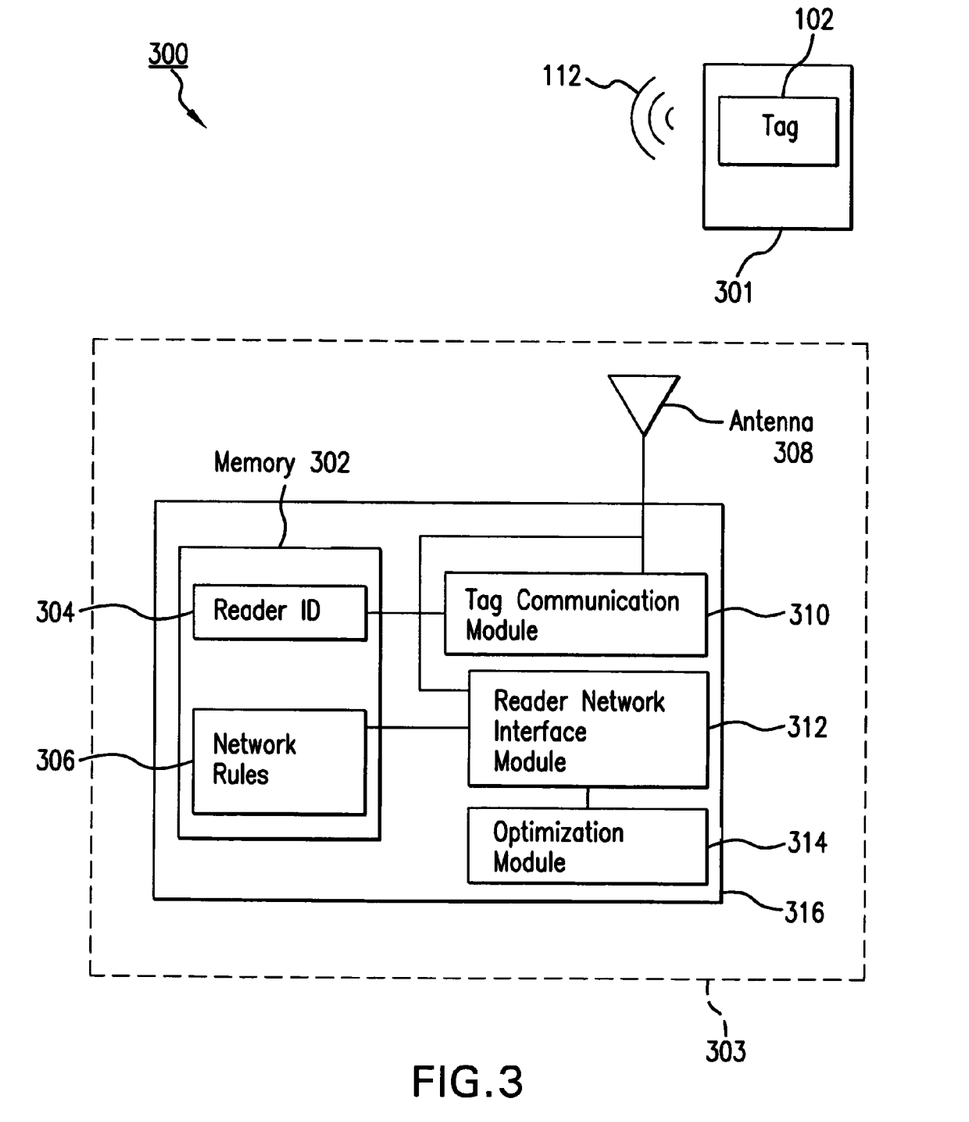
FIG. 3 shows various example components of a RFID reader, according to an embodiment of the present invention.

FIG. 3 shows a system 300 including a reader 303 and an item 301, according to an embodiment of the present invention. Reader 303 is configured to operate in a reader network, such as reader network 106 shown in FIG. 1. Reader 303 has an antenna 308. In embodiments, reader 303 may have more than one antenna 308. Reader 303 further includes a tag communication module 310, a reader interface module 312, an optimization module 314, an enclosure 316, and a memory 302. In embodiments, any number of readers 303 can be present in a reader network.

Tag communication module 310, reader interface module 312, and optimization module 314 may each include software, hardware, and/or firmware, or any combination thereof, for performing their respective functionalities, which are described in further detail below. For example, reader 303 may include a processor that executes instructions stored in a computer readable medium. Furthermore, reader 303 can include a user interface, including a keyboard, display, graphical user interface (GUI), pointing device, and/or other visual and/or audio indicators, for enabling a user to interact with reader 303 as needed.

Tag communication module 310 is coupled to antenna 308. Tag communication module 310 is configured to control communications between reader 303 and RFID tags. Tag communication module 310 generates read signals that are transmitted by antenna 308 to tags, and receives tag response signals (such as shown in FIG. 1) through antenna 308. Tag communication module 310 may have built-in intelligence to decode and process response signals on-board, or it may transmit information of the response signals to a remote computer system for processing. Tag communication module 310 may alternatively be referred to as a "reader module." As shown in FIG. 3, item 301 has an associated tag 102. Reader 303 can communicate with tag 102 by issuing commands from tag communication module 310.

Reader network interface module 312 is coupled to antenna 308. Reader network interface module 312 is configured to control communications between reader 303 and other readers of the reader network. Reader network interface module 312 generates a reader communication signal 114 transmitted by antenna 308 to communicate with other readers in the network. For example, reader network interface module 312 may generate a signal requesting information from one or more other readers of the network, or may generate a signal responding to a request for information from another reader in the network. Reader network interface module 312 also receives reader communication signals 114 through antenna 308 that were transmitted by other readers. For example, reader network interface module 312 may receive a signal requesting information from another reader of the network, or may receive a response signal from another reader of the network to a request for information transmitted by reader 303.

In an embodiment, a received signal 114 contains interrogation statistics compiled by other readers in the network that will allow reader 303 to more efficiently interrogate one or more tags. For example, in an embodiment, signal 114 may include sufficient interrogation information about a tag such that reader 303 no longer needs to interrogate the tag, or needs to interrogate the tag for less information than it would have otherwise. Furthermore, reader 303 can transmit a signal 114 including information it has received regarding a tag to reduce or eliminate the need for one or more other readers of the reader network to interrogate the tag.

Reader network interface module 312 is coupled to optimization module 314. Optimization module 314 analyses and processes data, such as interrogation statistics, obtained from reader network interface module 312. Example interrogation statistics include information on one or more tags that have already been read (such as identification numbers and/or stored data), information on tags that have not been read, plans that other readers have for interrogating particular tags, etc. Optimization module 314 uses the interrogation statistics to determine whether reader 303 needs to read one or more tags (i.e., whether the desired data has already been obtained), and to determine whether reader 303 can issue an interrogation command safely without interfering with commands issued by other readers.

Note that tag communication module 308 and reader network interface module 312 may use the same antenna 308, or separate antennas. Thus, in an embodiment, reader 303 may include more than one antennas.

As shown in FIG. 3, memory 302 of reader 303 stores a reader identification (ID) number 304 associated with reader 303. Memory 302 also stores network rules 306. ID number 304 allows reader 303 to be identified in a reader network 106. For example, ID number 304 can be used to identify a particular reader 303 when it communicates with other readers in a reader network. In an embodiment, reader 303 includes ID number 304 in a communication signal when communicating with other readers in a reader network (e.g., includes ID number 304 in reader signal 114 of FIG. 1). ID numbers 304 for readers in a reader network can be stored (e.g., in memory 302 of each reader, in memory of a primary reader, etc.) to keep track of the readers in a reader network. Furthermore, by receiving and storing ID numbers 304 of other readers, a reader can direct a reader communications signal 114 to particular readers by including the ID number of the particular reader in the reader communication signal 114.

Network rules 306 stored in the memory 302 of reader 303 control how reader 303 interacts with other readers in the reader network. Thus, reader network interface module 312 and/or optimization module 314 may access and use network rules 306 to modify operation of reader 303 in the reader network. Further detail regarding these rules is provided below.

Memory 302 can include any type of storage medium, including memory components, disc-based storage, magnetic storage devices, optical storage, etc.

Example Network Operational Embodiments

In an embodiment, a reader network is self-configuring or self-assembling, where individual readers enter and exit the reader network while maintaining network performance. Such a reader network can be considered as a dynamic "plug and play" system. Various reader exemplary operational configurations for reader networks are described below.

In embodiments, readers of a reader network operate in a "nearest neighbor" mode or environment which is dynamically self-configured. In an embodiment, operation of reader networks are "expert system" rule-based, where the expert-system rules govern the tag interrogation sequence ensuring little or no interference. As a reader enters a reader network, it wirelessly requests and downloads the rules for the environment. The downloaded rules are stored in the reader memory 302. Readers operate substantially autonomously based on the network rules.

Figure 4:
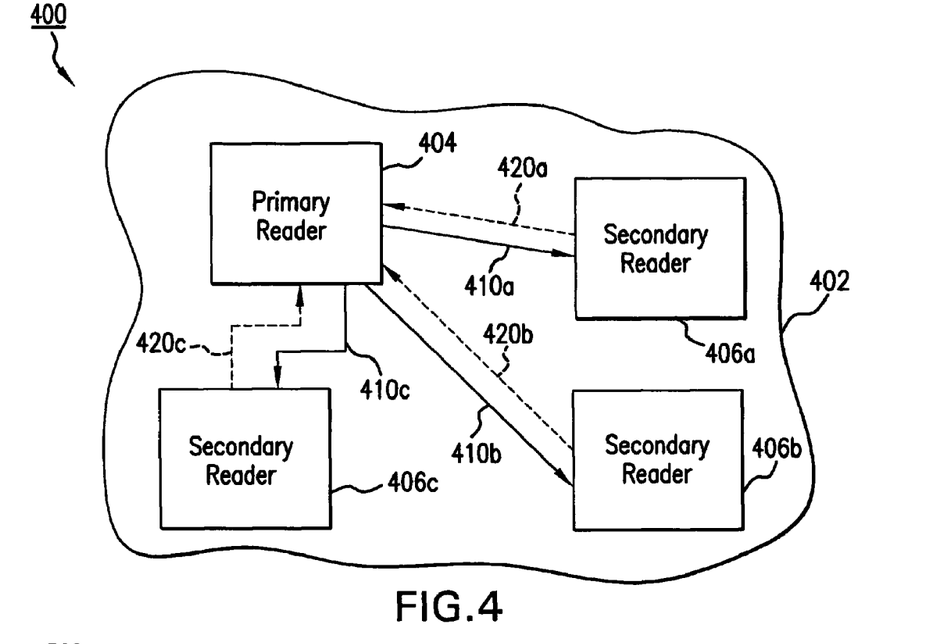
FIG. 4 shows an example RFID reader network based on the "primary/secondary" mode of operation, according to an embodiment of the present invention.
Figure 5:
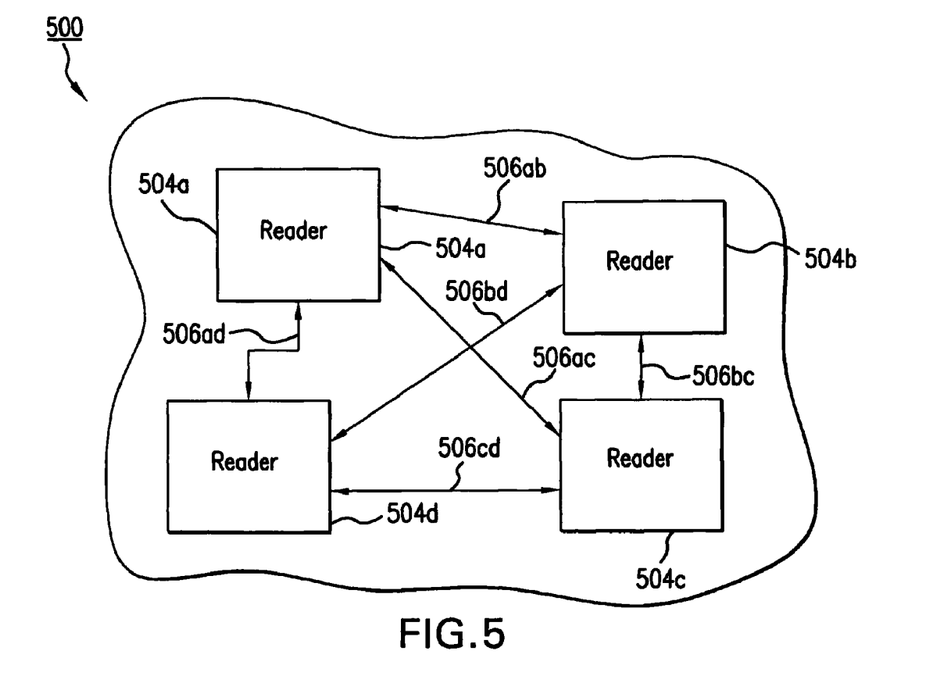
FIG. 5 shows an example reader network based on the "distributed element" mode of operation, according to an embodiment of the present invention.

FIGS. 4 and 5 depict example embodiments of reader networks of the present invention. FIG. 4 shows an example reader communications environment 400. Reader communications environment 400 includes a reader network 402 configured as in a "primary/secondary" reader network configuration. Reader network 402 includes a primary reader 404 and a plurality of secondary readers 406a-406c. In embodiments, there can be any number of secondary readers 406 in network 402. Furthermore, in a primary/secondary reader network embodiment, typically there is a single primary reader 402 present, but alternatively, additional primary readers 402 can be present that coordinate the primary reader function.

In an embodiment, primary reader 404 is the first reader to enter reader network 402. Because primary reader 404 is the first reader to enter reader network 402, primary reader 404 creates reader network 402. Alternatively, primary reader 404 can be configured to assume the primary reader role for a reader network even if not the first reader to enter reader network 402.

Primary reader 404 stores network rules in its memory (not shown in FIG. 4). As secondary readers 406a-406c enter reader network 402, they transmit signals 420a-420c to primary reader 404. Upon receiving each of signals 420a-420c, primary reader 404 determines whether each of secondary readers 406a-406c can enter reader network 402. Furthermore, primary reader 404 transmits a set of rules to secondary readers 406a-406c (or indicates which of a set of rules pre-stored by readers 406a-406c) that are to be used for controlling communications in reader network 402. For example, a network rule may dictate that a secondary reader 406 must query primary reader 404, and receive an instruction 410 from primary reader 404 before the secondary reader is allowed to transmit a tag interrogation signal.

FIG. 5 shows an example reader communications environment 500. Reader communications environment 500 includes a reader network 502. Reader network 502 includes readers 504a-504d. In this embodiment, a primary reader is not designated, and readers 504a-504d share management responsibilities for reader network 502. Readers 504a-504d within reader network 502 communicate with one another to self-optimize reader network 502, such as tag interrogation communications.

In an embodiment, a set of network rules are pre-stored in each of the readers 504a-504d, and are used to control communications in reader network 502. Alternatively, the network rules may be passed from one reader 504 to the next, as they enter reader network 502. Thus, reader network 502 operates in a "distributed element" mode. Reader 504 in reader network 502 may confer with each other and/or listen to the communication environment before initiating communications with tags.

For example, in an embodiment, reader 504a issues a tag interrogation command after checking with one or more of the others of readers 504b-d in reader network 502. For example, as shown in FIG. 5, reader 504a communicates bi-directionally with reader 504b via reader communication signal 506ab, with reader 504c via reader communication signal 506ac, and with reader 504d via reader communication signal 506ad, to determine whether reader 504a can interrogate (e.g., without collision). Thus, in the embodiment of FIG. 5, each of readers 504a-d enjoys substantially equal regulatory status for reader network 502.

As mentioned before, a "listen-before-talk" or LBT protocol may be used by readers in a reader network to avoid interference among interrogation signals. Once a reader determines an "idle" window, where no other reader is using the current communication channel to interrogate a RFID tag, the reader may proceed with a tag interrogation. For example, the reader may use a receiver of tag communications module 310 to listen for interrogations being performed by other readers on the communication channel. If no interrogations are detected on the communications channel, the reader may transmit a tag interrogation on the communication channel. Alternatively, the reader may request and receive approval from the reader network to issue the interrogation command. This flexibility enhances the overall performance of the reader system significantly.

Figure 6:
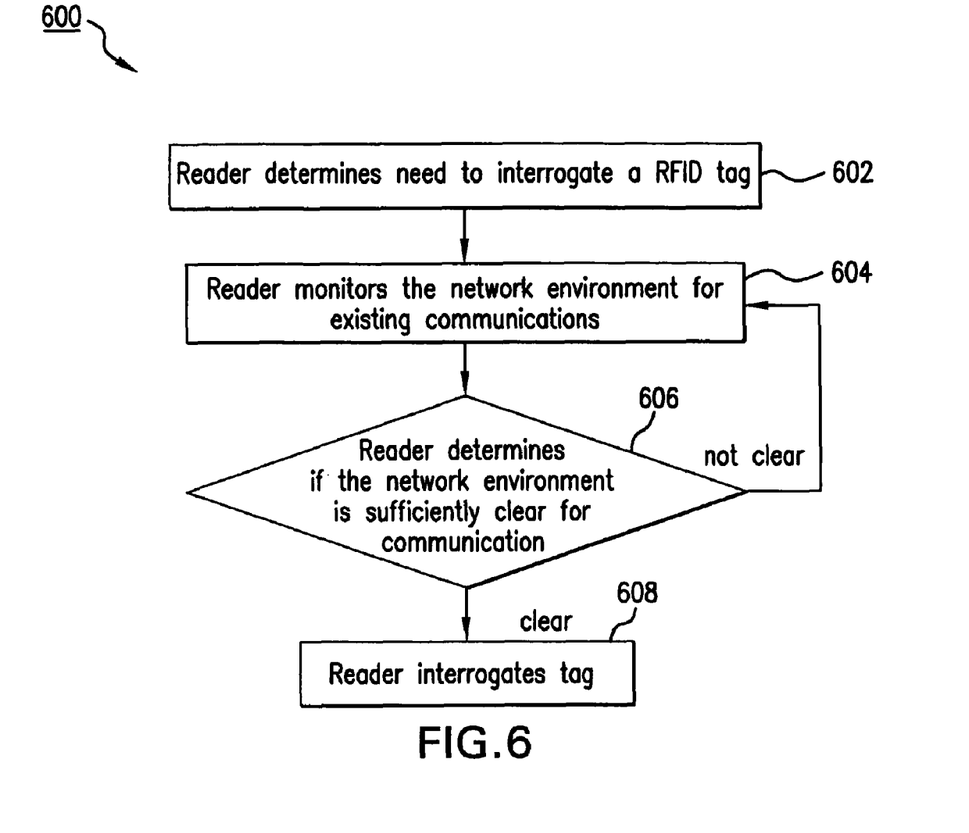
FIGS. 6-9 show flowcharts providing example embodiments of the present invention for the operation of readers with regard to a reader network.

FIG. 6 shows a flowchart 600 providing steps for example communications in a reader network. Flowchart 600 relates to an example LBT protocol. The steps of flowchart 600 can be performed by embodiments of readers described herein. Other structural and operational embodiments will be apparent to persons skilled in the relevant art(s) based on the following discussion related to flowchart 600. The steps shown in FIG. 6 do not necessarily have to occur in the order shown.

Flowchart 600 begins with step 602. In step 602, a reader determines that it needs to interrogate a tag. For example, an operator of the reader initiates a read of a tag, the reader receives a remote command to initiate a read of a tag population, or other mechanism triggers the interrogation.

In step 604, the reader then monitors the network environment for existing communications. For example, the reader checks for existing communication signals being exchanged between other readers and/or between readers and tags. If such communications exist, an interrogation of the tag may need to be delayed.

In step 606, the reader determines whether the network environment is sufficiently clear to initiate communications. For example, the reader determines whether it can interrogate a tag without being interfered with. If the reader determines the communication channel to be sufficiently clear, operation proceeds to step 608. Otherwise, if the reader determines that the communication channel is not sufficiently clear, the reader returns to step 604, and checks for existing communications once again.

In step 608, the reader communicates with the tag, such as by transmitting a tag interrogation command.

Figure 7:
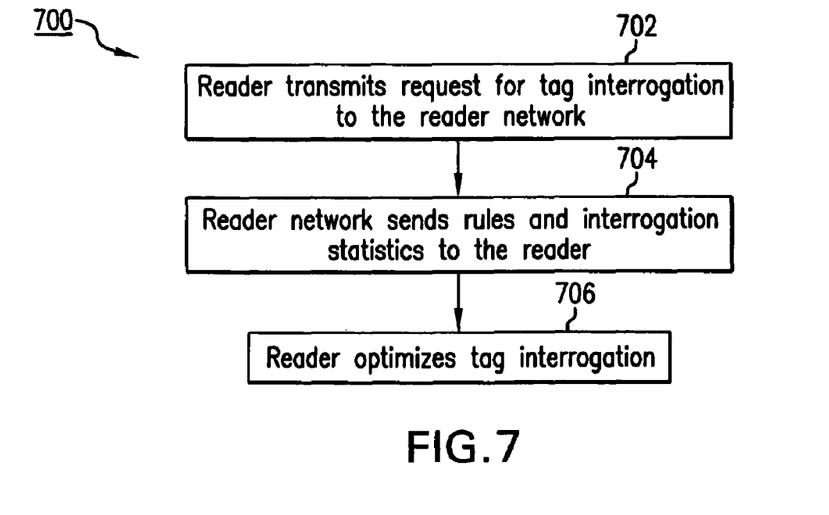

Another embodiment for communications in a reader network is described with respect to a flowchart 700 in FIG. 7. Flowchart 700 describes example steps for a reader to obtain clearance from the reader network to interrogate a tag. Other structural and operational embodiments will be apparent to persons skilled in the relevant art(s) based on the following discussion related to flowchart 700.

Flowchart 700 begins with step 702. In step 702, the reader transmits a request to the reader network to interrogate a tag. As described earlier, this request can be transmitted to the primary reader in a primary/secondary reader network configuration (e.g., FIG. 4), or can be transmitted to one or more of the readers within the nearest neighborhood in a distributed reader network configuration (e.g., FIG. 5).

In step 704, the reader network transmits rules and/or interrogation statistics to the requesting reader. Interrogation statistics may contain information about the history of interrogation requests transmitted to a tag by the readers within a preceding time-period. The rules may contain specific instructions, such placing the reader into a queue for interrogating the tag until other readers with higher priority have finished their interrogation(s).

In step 706, the reader optimizes an interrogation of the tag. Various optimization strategies are described elsewhere herein. For example, based on the rules and interrogation statistics, the reader determines an optimal time period for interrogation of the tag, reducing the probability of interference.

Figure 8:
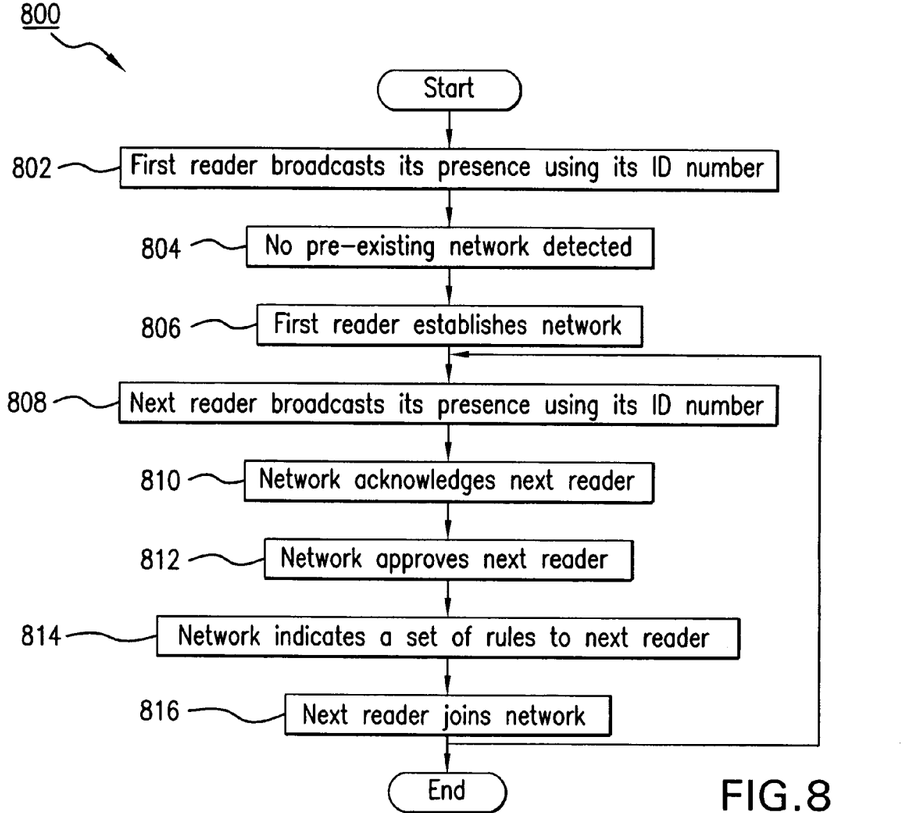

In embodiments, as described above, reader networks can be formed in a "plug and play" fashion, by readers periodically entering and exiting the reader network as needed. For example, FIG. 8 shows a flowchart 800 describing how a reader network is dynamically established and modified in a dense reader environment. The steps of flowchart 800 can be performed by embodiments of the readers described herein. Other structural and operational embodiments will be apparent to persons skilled in the relevant art(s) based on the following discussion related to flowchart 800. The steps shown in FIG. 8 do not necessarily have to occur in the order shown. The steps of FIG. 8 are described in detail below.

Flowchart 800 begins with step 802. In step 802, a first reader broadcasts its presence by transmitting the ID number associated with the reader.

In step 804, the first reader detects the absence of a network. For example, the first reader is a first reader to attempt to join/form a network in a particular local environment. Thus, due to a lack of response from readers in a network, the first reader determines that no reader network exists.

In step 806, the first reader establishes a network. As an example, the first reader can be primary reader 404, as described in FIG. 4. Alternatively, the first reader can be one of readers 504 of FIG. 5. In an embodiment, the first reader can begin a listing of readers in the network by their respective reader identification numbers, including its own reader identification number. Furthermore, in an embodiment, the first reader can select/designate a set of rules to be used by the reader network.

In step 808, a next reader transmits a request to join the network. The request data stream from the next reader contains the ID number of the next reader, among other information.

In step 810, the request by the next reader is acknowledged by the reader network. For example, in a primary/secondary reader network configuration, the primary reader may acknowledge the request by the next reader. Alternatively, a secondary reader may acknowledge the request. The acknowledgement may be in the form of a response signal transmitted by a reader of the reader network, for example.

In step 812, the network approves the next reader as a member of the network. Thus, in an embodiment, the identification number of the next reader is added to the list of readers in the network. A message may be transmitted to the next reader from a reader of the network indicating the next reader was approved. Alternatively, the network may reject the next reader, and not allow the next reader to join the network.

In step 814, the network provides an indication of a set of network rules to the second reader. For example, in an embodiment, the rules are transmitted by a reader of the reader network to the next reader. The next reader stores the rules in the reader memory. Alternatively, the rules were pre-stored in the next reader. A reader of the network may provide an indication to the next reader which set of rules of the pre-stored rules are to be used.

In step 816, the next reader joins the network. In a similar fashion, a third reader, a fourth reader and any number of additional readers can join the reader network by repeating steps 808-816. This process is part of the flexible "plug and play" operation of the network.

Figure 9:
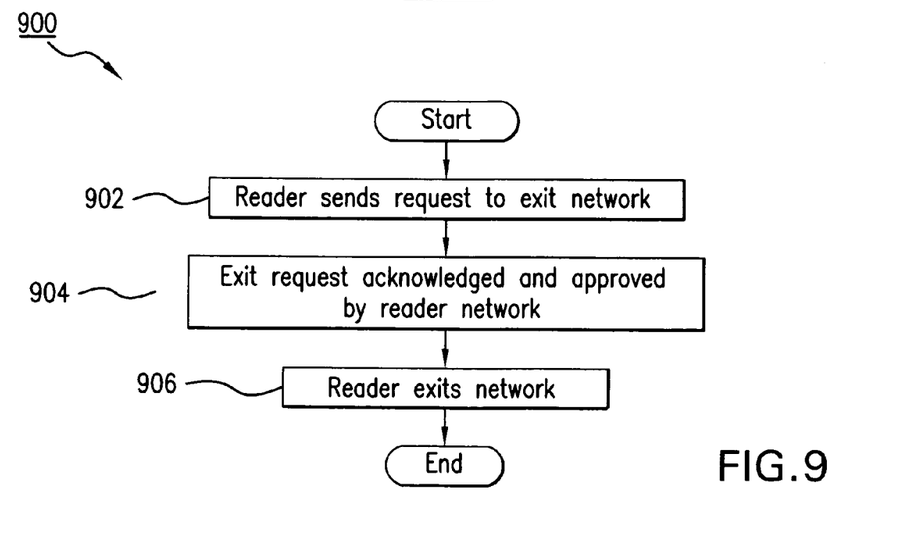

FIG. 9 shows a flowchart 900 describing how a reader exits a reader network. For example, the reader may determine that it no longer will interrogate the current population of tags, and thus, no longer needs to remain within the network.

Flowchart 900 begins with step 902. In step 902, the reader transmits a request to exit the network. For example, the request is received by a reader in the reader network, such as a primary reader (when present).

In step 904, the exit request of the reader is acknowledged and approved by the reader network. For example, a reader in the reader network indicates in a response that the exit request has been received. If the exit request is approved, the identification number of the reader is removed from the list of readers in the network. Furthermore, a reader in the reader network may indicate in a transmitted message to the exiting reader that its request has been approved.

In step 906, the reader exits the reader network. Thus, in an embodiment, the reader no longer conducts communications according to the set of rules for the reader network, and generally no longer operates as if a member of the reader network.

Example Improved Listen Before Talk Communications Embodiments

As described above, when multiple RFID readers are in the same communications environment, in one implementation, the readers listen for transmissions from other readers (and other signal sources) in a specific band of frequencies before they attempt to transmit within this frequency band. The technique is called Listen Before Talk (LBT). The LBT technique prevents readers interfering with each other's transmissions. However, the LBT approach presents a significant limitation to reader system efficiency when the number of readers becomes large. Specifically, if there is a number "N" of available frequency channels within which a number "R" of readers communicate, when R becomes greater than or equal to N, reader accessibility to free or clear channels becomes increasingly limited. This performance degradation is known in the RFID industry as "the dense reader problem."

In an example LBT reader communications environment, assume that N is a number of available frequency channels, and that $R_A$ is a number of active readers communicating in the environment.

$$R_A = R_T * D \qquad \text{Equation 1}$$

where:

$R_T$ is a total number of readers, and

D is a reader duty cycle.

The duty cycle D relates to the amount of time during which readers performs communications with tags relative to the amount time during which the reader is not performing communications with tags. A duty cycle D can be calculated as an amount of time spent communicating divided by a total amount of time spent communicating and not communicating. For example, a reader may have a duty cycle of 0.25 if it spends one quarter of its active time communicating with tags. In a LBT environment, duty cycle D is less than 1, because a reader must spend some time waiting for other readers to cease communications before initiating its own communications with tags.

In an embodiment, a plurality of N frequency channels are available for readers to choose from for communicating with tags. During communications within the environment, a probability P(0) that no frequency channel will be selected by a reader is expressed as:

$$P(0) = \exp(-R_A/N) \qquad \text{Equation 2}$$

A probability P(1) that a particular frequency channel is selected by only one reader for communication is expressed as:

$$P(1) = (R_A/N) * \exp(-R_A/N) \qquad \text{Equation 3}$$

A probability P(>1) that a frequency channel has been selected by more than one reader (two or more) is expressed as:

$$P(>1) = 1 - P(0) - P(1) \qquad \text{Equation 4}$$

A probability P($\geq$1) that a frequency channel has been selected by one or more readers is expressed as:

$$P(\geq 1) = 1 - P(0) = 1 - \exp(-R_A/N) \qquad \text{Equation 5}$$

A number of readers in the LBT environment where they are the only readers to have selected a particular frequency channel is equal to N*P(1).

A total number of active readers in the LBT environment (readers attempting to communicate on frequency channels) is equal to N*P($\geq$1).

In a LBT environment, it is assumed that if multiple readers select a particular frequency channel, only one of the multiple readers becomes active in that particular frequency channel to avoid communication collisions.

Figure 10:
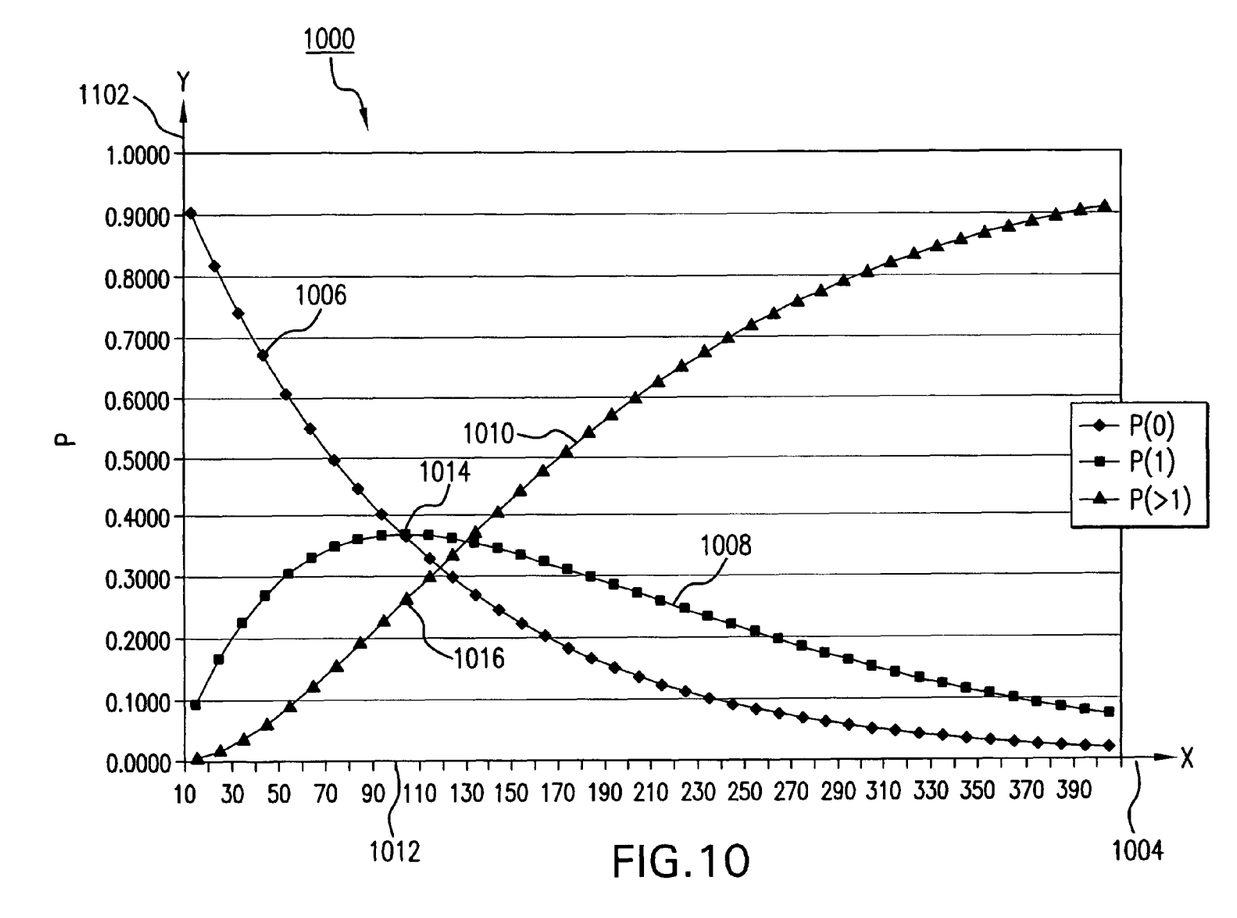
FIG. 10 shows a graph of probabilities versus number of readers for an example fixed number of frequency channels.

FIG. 10 shows a graph 1000 showing various probabilities for reader communications that can occur in an example LBT environment. Graph 1000 shows probabilities on a Y-axis 1002 versus a number of readers on an X-axis 1004 for an example fixed number of frequency channels N=100. In graph 1000, P(0) is plotted as curve 1006, P(1) is plotted as curve 1008, and P(>1) is plotted as curve 1010.

A point 1012 on X-axis 1004 of graph 1000 represents a point where the number of readers $R_T$=N (the number of frequency channels). As shown by graph 1000, probability P(1) of curve 1008 has a maximum probability of approximately 0.37, at point 1014, which is also where $R_T$=N. Thus, the maximum probability exists at $R_T$=N for a frequency channel to have been selected by only one reader. P(0) curve 1006 also has a probability of approximately 0.37 at point 1014. P(>1) curve 1010 has a probability of approximately 0.26 at point 1016, where $R_T$=N.

An efficiency $E_{FA}$ of frequency channel accessibility in the environment is expressed as:

$$E_{FA} = N*P(1)/R_T = D*\exp(-R_A/N) \qquad \text{Equation 6}$$

A reader efficiency $E_R$ is expressed as:

$$E_R = N*P(\geq 1)/R_T = (N/R_T)*(1-\exp(-R_A/N)) \qquad \text{Equation 7}$$

where:

for $R_A >> N$, $E_R$ has the limit $N/R_T$.

Thus, as the total number of readers $R_T$ becomes large, reader efficiency $E_R$ approaches $N/R_T$, while $E_{FA}$ exponentially approaches zero.

This description above statistically describes the dense reader problem. As the number of readers, $R_T$, becomes larger than the number of available frequency channels, N, an increasingly larger number of readers contend for access to the frequency channels. The accessibility of frequency channels that are clear of readers exponentially approaches zero as $R_T$ becomes larger than N. Because of the LBT requirements of the environment, only a single reader can use each frequency channel at any one time, and other readers are forced to remain inactive. This drives reader efficiency $E_R$ towards $N/R_T$.

Embodiments of the present invention improve upon existing LBT approaches, to better optimize usage of frequency channels for improved efficiency of reader communications.

In an embodiment, readers may be configured to meet a desired communication duty cycle. For example, the readers may be configured to not communicate for a period of time after performing a tag interrogation to meet the desired duty cycle. In this manner, the communication environment may benefit from fewer readers contending for frequency channels at any one time. Any duty cycle may be used. For example, to avoid the exponential drop-off in $E_{FA}$, readers in a reader network may be configured to maintain duty cycles D=$N/R_T$, for which P(1) is its maximum value of 0.37 (shown in graph 1000), P(0)=P(1)=0.37, and where P($\geq$1)=0.63 and P(>1)=0.26. Thus, in an embodiment, a duty cycle of D=$N/R_T$ may be used.

Figure 11:
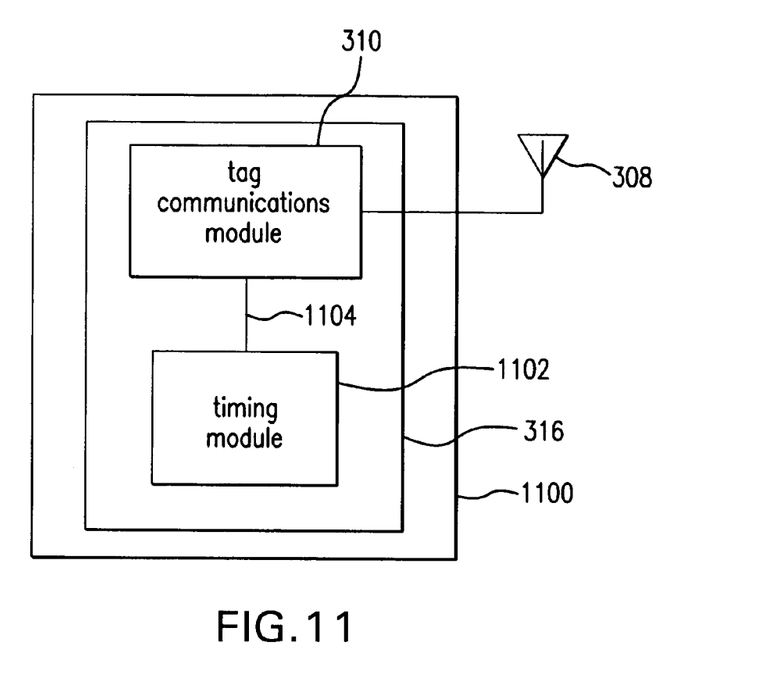
FIG. 11 shows a reader having a timing module, according to an example embodiment of the present invention.

For example, FIG. 11 shows a reader 1100 having a timing module 1102 coupled to tag communications module 310. Timing module 1102 monitors communications performed by tag communications module 310. For example, timing module 1102 determines how much time elapses during a particular tag interrogation by tag communications module 310. Furthermore, timing module 1102 determines how many readers $R_T$ are present in the local environment and how many frequency channels N are available. For example, when present, a primary reader of a reader network may provide this information to reader 1100, the information may be maintained by reader 1100, or it may be determined in another fashion. Timing module 1102 calculates a desired duty cycle from the determined information. After tag interrogations, timing module 1102 calculates how much time tag communications module 310 should stop communicating in order to meet the desired duty cycle D for reader 1100.

For example, the number of frequency channels may be N=10 and the number of readers in the local environment contending for the 10 channels may be $R_T$=100. As described above, in an embodiment, the equation $D=N/R_T$ may be used to determine the duty cycle. Entering these parameters into this equation for D, timing module 1102 determines a duty cycle to be maintained of $D=10/100=0.1$. Thus, timing module 1102 provides a timing signal 1104 to tag communications module 310 to indicate to tag communications module 310 how long after a tag interrogation it should not communicate to maintain this duty cycle. For example, if a first tag interrogation by tag communications module 310 takes 1.0 msec, timing module 1102 indicates to tag communications module 310 that it should wait (i.e., cease further interrogations after the first interrogation) for 9.0 msec before initiating a second tag interrogation, in order to maintain the 0.1 duty cycle.

By turning off readers in a controlled fashion to maintain desired duty cycles, the number of active readers contending for the available frequency channels is reduced. Using a desired duty cycle of $D=N/R_T$ leads to the number of readers effectively equaling the number of frequency channels for the dense reader system. Each reader may calculate a duty cycle D independently, or a duty cycle may be calculated by a primary reader and supplied to the secondary readers for use.

In an embodiment, if the number of readers $R_T$ is less than the number of frequency channels N, a reader can adjust its duty cycle such that it can always communicate with tags, because each reader should be able to obtain its own frequency channel.

Timing module 1102 can be implemented in hardware, software, firmware, and any combination thereof.

According to graph 1000 of FIG. 10, maintaining a duty cycle $D=N/R_T$ leaves a 0.26 probability $P(>1)$ that a frequency channel will have two or more readers contending for it. Thus, even with this duty cycle setting for readers, a number of frequency channels may still have multiple readers contending for them. Embodiments of the present invention enable efficient access to a contended frequency channel by multiple readers.

Figure 12:
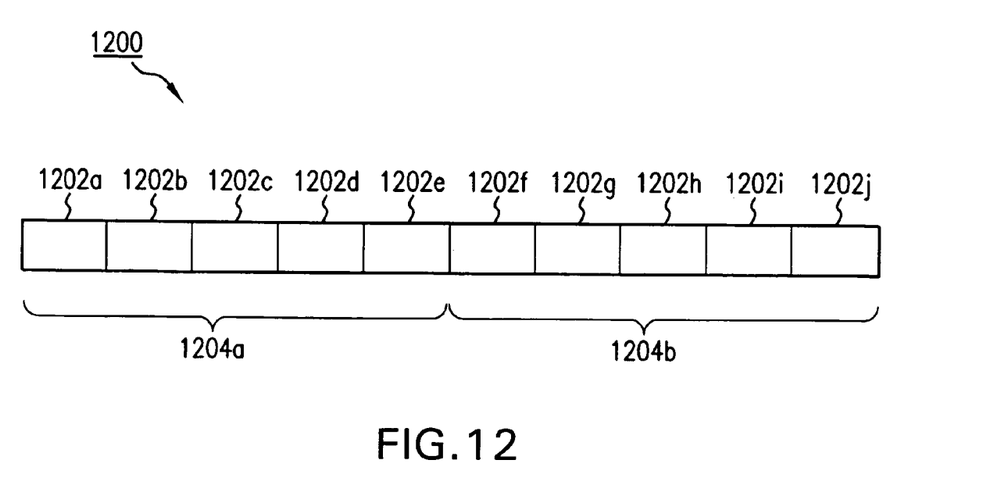
FIG. 12 shows a time chart having a plurality of reader selectable time slots, according to an example embodiment of the present invention.

In an embodiment, when multiple readers select an occupied frequency channel, the readers randomly select a time slot, which can viewed as a "hold-off" time, to start tag interrogation. For example, FIG. 12 shows a time slot chart 1200 having a plurality of reader selectable time slots 1202a-j. In FIG. 12, for illustrative purposes, ten time slots 1202a-j are shown, but in embodiments, any number of time slots may be present.

In the present embodiment, when multiple readers contend for a frequency channel that is already in use, each reader selects one of time slots 1202a-j, in a random or other fashion. The reader that selects the earlier slot secures the frequency channel first, and can communicate on the frequency channel first. Any other readers that have selected later time slots can continue to wait for the frequency channel to clear, or can jump to a different frequency channel. For example if a first waiting reader selects time slot 1202e, and a second waiting reader selects time slot 1202b, the second waiting reader can communicate on the frequency channel first, because time slot 1202b is earlier than time slot 1202e.

In an embodiment, each reader selecting a time slot checks its time slot for communications when the time slot arrives. For example, each time slot may be spaced by a pre-determined amount of time, such as 0.01 msec. Therefore, the reader selecting the earliest time slot checks its time slot for communications, and if clear, begins communication first. The readers selecting later time slots detect that the first reader is already communicating on the frequency channel when their time slot arrives, and thus these subsequent readers do not try to communicate on the frequency channel. In an embodiment, these subsequent readers re-select time slots again once the reader with the earliest time slot is finished communicating on the frequency channel.

Figure 13:
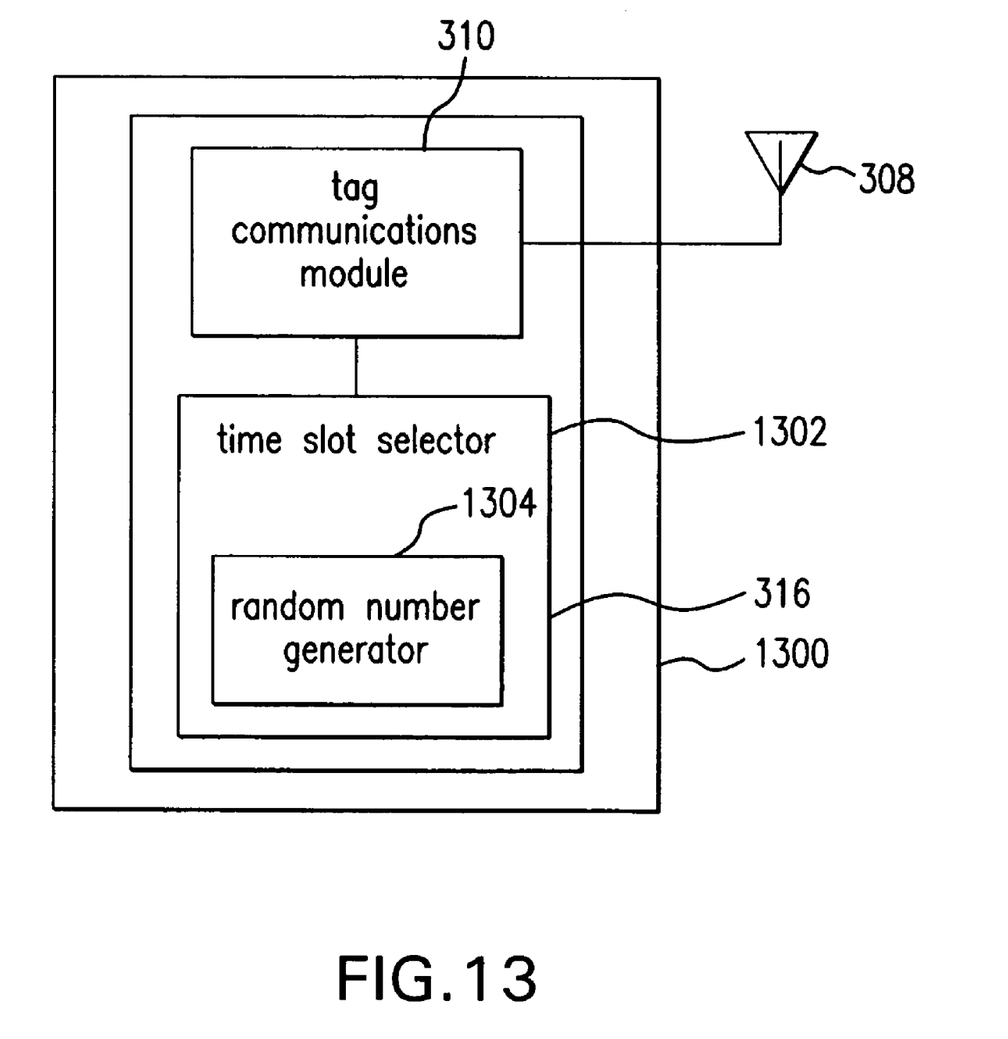
FIG. 13 shows a reader having a time slot selector to select a time slot for a reader, according to an embodiment of the present invention.

FIG. 13 shows a reader 1300 having a time slot selector 1302 to select a time slot for a reader, according to an embodiment of the present invention. Time slot selector 1302 is coupled to tag communications module 310, and controls which time slot tag communications module 310 initiates a tag interrogation (or other communication). As shown in FIG. 13, time slot selector 1302 can have a random number generator 1304. Random number generator 1304 may be used to select a time slot in a random manner. Time slot selector 1302 may also have a timer (not shown) for determining when a selected time slot has arrived. Time slot selector 1302 and random number generator 1304 (when present) can be implemented in hardware, software, firmware, and any combination thereof.

In an embodiment, the time slot approach is augmented by a weighting function, which may be implemented in random number generator 1304. The weighting function weights a time slot selection function to select earlier time slots every time that the reader fails to secure a frequency channel. For example, if a first reader selects an earlier time slot than a second reader, and thus the first reader secures the frequency channel, the second reader will re-select a time slot the next time the frequency channel comes open. The re-selection of the time slot will use the weighting function so that an earlier time slot is selected than was selected the first time by the second reader. This can be repeated each time that a reader does not gain access to a frequency channel. Eventually the reader will gain access to the frequency channel because their time slot selection is increasingly biased towards an earlier time.

In an embodiment, after a reader has secured a frequency channel and completed a tag interrogation, or performed other communication on the channel, the reader shuts down for the duration of the duty cycle defined above, and the weighting function is reset for a next communications round.

In an embodiment, the time slot approach is further augmented by a priority function, providing priority to selected readers. For example, a selected reader may be a reader located at a dock door, where the reader needs to be active immediately after a sensor detects the presence of tagged items. As shown in FIG. 12, time slots 1202a-j are divided into two sections. Time slots 1202a-e are a first set 1204a of time slots and time slots 1202f-j are a second set 1204b of time slots. First set 1204a is an earlier set of time slots used for higher priority interrogations, and second set 1204b is a later set of times slots that are used for standard, lower, or non-priority interrogations. Time slots 1202 may be divided in any manner to create two or more sets of time slots for different priorities, as desired for the particular application.

When a reader is designated as a priority reader, and/or receives a interrupt considered a priority interrupt, certain operations may occur. For example, if the reader is in the non-communicative portion of its duty cycle (as described above), the reader may be caused to "wake up", select a frequency channel, and exercise its LBT functionality. For instance, if the frequency channel is already occupied by another reader, time slot selector 1302 may select a time slot for the reader from first set 1204a. By selecting a priority time slot, this would more likely insure access to the frequency channel when it becomes free. Readers that are not designed as priority readers would select time slots from second set 1204b.

Further priority schemes may be recognized by persons skilled in the relevant art(s) from the teachings herein, and are within the scope and spirit of the present invention. For example, in another priority scheme embodiment, the length of the duty cycle portion during which the reader does not communicate is varied depending on reader priority. For example, shorter duty cycle shut down periods may be given to higher priority readers, while longer duty cycle shut down portion periods may be given to lower priority readers. For example, a reader may receive or calculate a duty cycle, and then multiply the duty cycle by a priority factor to decrease or increase the duty cycle. Further priority schemes may be additionally and/or alternatively used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A radio frequency identification (RFID) communications system, comprising:
    a plurality of readers that form a network, wherein the plurality of readers comprise a primar reader and a plurality of secondary readers each communicatively coupled to the primary reader, and wherein each of the plurality of readers operates at least semi-autonomously in the network based on a set of local network rules, and wherein each reader of the plurality of readers comprises:
    (a) at least one antenna;
    (b) a tag communications module coupled to the at least one antenna and configured to interrogate tags within a communication range of the reader;
    (c) an identification (ID) number that identifies the reader;
    (d) a reader network interface module coupled to the at least one antenna and configured to communicate with readers of the network;
    (e) a memory, wherein the memory stores at least one set of local reader network rules; and
    (f) a timing module coupled to the tag communications module, the timing module providing a signal to the tag communications module that is related to a number of readers in the network and a number of available frequency channels, the signal indicating an amount of time the communications module is not to communicate to maintain a duty cycle of the reader.

2. The system of claim 1, wherein each reader of the plurality of readers further comprises:
    an optimization module that uses logic to optimize interrogations of tags by the reader in the reader network.

3. The system of claim 1, further comprising:
    a population of RFID tags, wherein each tag of the population is in communication range of at least one of the readers.

4. The system of claim 1, wherein a first reader of the plurality of readers is configured to transmit information regarding a tag within a communication range of the first reader to a second reader of the plurality of readers.

5. The system of claim 4, wherein the first reader and the second reader communicate with the at least one common tag according to one of the following communication protocols: Gen2, Class0, or Class1.

6. The system of claim 1, wherein the primary reader is a first reader to enter the network.

7. The system of claim 1, wherein the plurality of readers other than the primary reader each receives the set of local network rules from the primary reader.

8. The system of claim 1, wherein the primary reader instructs each reader of the plurality of readers to use a particular set of local network rules stored in the memory.

9. The system of claim 1, wherein a reader of the plurality of readers listens for communications before transmitting a communication signal.

10. The system of claim 1, wherein each reader uses a selected rule set of the at least one set of local network rules to regulate communications with other readers of the network.

11. A radio frequency identification (RFID) reader, comprising:
    (a) at least one antenna;
    (b) a tag communications module coupled to the at least one antenna and configured to interrogate tags;
    (c) an identification number (ID) that identifies the reader in a reader network as either a primary reader communicatively coupled to a plurality of secondary readers or a secondary reader communicatively coupled to another primary reader;
    (d) a reader network interface module coupled to the at least one antenna configured to communicate with readers in the reader network;
    (e) a memory, wherein the memory stores at least one set of local network rules, wherein the reader is configured to operate at least semi-autonomously in the reader network based on the at least one set of local network rules; and
    (f) a timing module coupled to the tag communications module, the timing module providing a signal to the tag communications module that is related to a number of readers in the network and a number of available frequency channels, the signal indicating an amount of time the communications module is not to communicate to maintain a duty cycle of the reader.

12. The device of claim 11, wherein the reader further comprises:
    an optimization module that uses logic to optimize interrogations of tags by the reader in the reader network.

13. The device of claim 11, wherein the device is configured to operate as primary reader in communication with a plurality of other readers operating as secondary readers.

14. A method of communication for a reader in a reader network, comprising:
    (a) transmitting a request to the reader network to interrogate a tag, the request including an identification number for the reader;
    (b) receiving a response from the reader network; and
    (c) interrogating the tag, wherein subsequent to interrogating the tag, the method comprising maintaining a duty cycle associated with the reader by prohibiting communication of the reader for a set amount of time approximately equal to the duty cycle, and wherein the duty cycle is related to a number of readers in the network and a number of available frequency channels;
    wherein the reader network comprises a plurality of readers that each operate at least semi-autonomously in the reader network based on a set of rules, and wherein the plurality of readers comprises at least one primary reader communicatively coupled to a plurality of secondary readers.

15. The method of claim 14, further comprising:
   (d) prior to step (c), listening to communications between at least one reader of the reader network and at least one tag; and
   (e) determining whether the communications would interfere with a tag interrogation.

16. The method of claim 14, wherein step (c) comprises: interrogating the tag if it is determined in step (e) of claim 16, that the communications would not interfere.

17. The method of claim 15, further comprising:
   (d) entering the reader network.

18. The method of claim 17, wherein step (d) further comprises:
   (1) determining whether a reader network exists;
   (2) initiating the reader network if the reader network does not exist; and
   (3) providing the identification number for the reader to the reader network.

19. The method of claim 14, further comprising:
   (d) receiving the set of rules dictating interaction of the reader with the reader network.

20. The method of claim 14, further comprising:
   (d) exiting the reader network.

21. The method of claim 20, wherein step (d) comprises:
   (1) transmitting a request to exit the reader network;
   (2) receiving an acknowledgement and approval of the exit request from the reader network; and
   (3) exiting the reader network.

22. The method of claim 14, further comprising:
   (d) receiving information in the response regarding requests to interrogate the tag by other readers of the reader network; and
   (e) using the information to optimize an interrogation of the tag in step (c).

23. The RFID communications system of claim 1, wherein each of the plurality of readers comprises a time slot selector coupled to the tag communications module, the time slot selector configured to select a time slot for the tag communication module to interrogate at least one tag.

24. The device of claim 11, wherein the reader comprises a time slot selector coupled to the tag communications module, the time slot selector configured to select a time slot for the tag communication module to interrogate at least one tag.

25. The method of claim 14, further comprising selecting a time slot for the tag communication module to interrogate at least one tag using a time slot selector of the reader.

* * * * *

UNITED STATES PATENT AND TRADEMARK OFFICE
CERTIFICATE OF CORRECTION

| | | |
|---|---|---|
| PATENT NO. | : 7,969,282 B2 | Page 1 of 1 |
| APPLICATION NO. | : 11/312606 | |
| DATED | : June 28, 2011 | |
| INVENTOR(S) | : Powell et al. | |

It is certified that error appears in the above-identified patent and that said Letters Patent is hereby corrected as shown below:

In Column 1, Line 9, delete "are" and insert -- is --, therefor.

In Column 1, Lines 9-10, delete "their entireties:" and insert -- its entirety: --, therefor.

In Column 15, Line 32, in Claim 1, delete "primar" and insert -- primary --, therefor.

Signed and Sealed this
Fifteenth Day of January, 2013

David J. Kappos
*Director of the United States Patent and Trademark Office*